(12) United States Patent
Salinas et al.

(10) Patent No.: US 6,498,716 B1
(45) Date of Patent: Dec. 24, 2002

(54) DC MAIN POWER DISTRIBUTION

(75) Inventors: Everett R. Salinas, Pasadena, TX (US); Allen T. Morrison, Tomball, TX (US)

(73) Assignee: Compaq Information Technologies Group, L.P., Houston, TX (US)

( * ) Notice: Subject to any disclaimer, the term of this patent is extended or adjusted under 35 U.S.C. 154(b) by 0 days.

(21) Appl. No.: 09/934,271

(22) Filed: Aug. 21, 2001

(51) Int. Cl.[7] .............................. H05K 7/06; G06F 1/16
(52) U.S. Cl. ...................... 361/610; 307/150; 361/727; 439/341
(58) Field of Search .............................. 307/33, 38, 39, 307/52, 129, 150; 439/61, 65, 341, 709, 949; 361/608, 610, 614, 622, 624, 625, 641, 657, 673, 675, 724–727, 752, 807, 809, 810, 826, 827

(56) References Cited

U.S. PATENT DOCUMENTS

| | | | | |
|---|---|---|---|---|
| 5,245,527 A | * | 9/1993 | Duff et al. | 363/131 |
| 5,666,264 A | * | 9/1997 | Chandler et al. | 361/683 |
| 5,969,965 A | * | 10/1999 | Byrne et al. | 363/144 |
| 6,058,019 A | * | 5/2000 | Graves et al. | 361/760 |
| 6,091,609 A | * | 7/2000 | Hutson et al. | 361/794 |
| 6,222,736 B1 | * | 4/2001 | Sim et al. | 361/727 |
| 6,327,157 B1 | * | 12/2001 | Mann et al. | 361/775 |
| 6,349,029 B1 | * | 2/2002 | Leman et al. | |

OTHER PUBLICATIONS

*Rapid Lock*, Elcon Products International Company 1999 (2 p.).

* cited by examiner

*Primary Examiner*—Gerald Tolin
(74) *Attorney, Agent, or Firm*—Conley, Rose & Tayon, P.C.; Michael F. Heim; Mark E. Scott (57) ABSTRACT

The present invention is a power distribution assembly for distributing power about a rack mounted server system. In particular, each chassis of a rack mounted server system is provided power through a power distribution assembly that is hinged to a back of the rack of the server system. Each of the power distribution assemblies may be in either an open position or a closed position. In a closed position, each of the power distribution assemblies is rotated to lie very close to a backplane board of a chassis of the server system. In an open position, each of the power distribution assemblies is swung around so that full access may be had to the backplane boards of the chassis in the server system.

26 Claims, 6 Drawing Sheets

FIG 11

DC MAIN POWER DISTRIBUTION

CROSS-REFERENCE TO RELATED APPLICATIONS

This application is related to application Ser. No. 09/933,941 filed concurrently herewith.

STATEMENT REGARDING FEDERALLY SPONSORED RESEARCH OR DEVELOPMENT

Not applicable.

BACKGROUND OF THE INVENTION

1. Field of the Invention

The present invention is related to distributing power to rack mounted electronic devices. More particularly, the present invention is related to routing direct current power to a plurality of rack-mounted computer systems in server operation. More particularly still, the present invention is directed to placement and mounting of power bus bars, circuit breakers, and the like, for rack mounted server systems.

2. Background of the Invention

As the size of computers becomes smaller, so too does the number of computers that may be placed in one particular place. For persons and entities providing server services, e.g., Internet service providers (ISPs) and corporate computer departments, smaller computer footprints allow a smaller required area, or more computers in the same areas already allocated.

Given that each server is effectively just an individual computer, each of these devices must have at least a power cable and a cable to carry information to and from the server. In years past, when a single computer may have occupied an entire drawer in a rack-mounted system, having the necessary space for power and information cables was not of particular concern. However, with the increasingly smaller footprints of modem computers, the necessary space to provide adequate cabling to each of these servers becomes a major concern. The trend in the industry is to replace the cable-bundle approach to providing cable access with the use of a backplane board.

A backplane board is simply an electrical circuit board placed at substantially right angles to the insertion direction of rack-mounted server systems. In such a system, the act of pushing the computer into the rack physically couples the computer to the backplane board. In this way, digital signals and power may be coupled to the computer system. Further, use of the backplane board allows the rack-mounted computer system designer to move cable connections, if any, to more desirable locations.

While these backplane boards typically have little, if any, logic circuitry, the boards can fail. The failure modes could include failure of any onboard circuitry, as well as failure of electrical traces on the board itself caused by mechanical stresses involved in inserting and removing the computer systems. Regardless of the cause, replacing backplane boards is a major undertaking, which may include disassembly of a substantial portion, or all, of the rack-mounted system including removal of the various power distribution buses, thus disabling the entire rack-mounted system.

Thus, what is needed in the art is a mechanism to distribute power in a rack-mounted server system that provides necessary amperage-carrying capability for more power-intensive operations, that is easily repairable, and that need not be removed or of disassembled in the event that a backplane board of the server system needs to be replaced.

BRIEF SUMMARY OF THE INVENTION

The problems noted above are solved in large part by a main power distribution assembly for rack mounted server systems, and the like, that places the power supply and return bars in hinged non-conductive containers that extend at least the partial height of the server system. Preferably, two of these power distribution assemblies are provided on each server system for providing fully redundant power supplies.

In normal operation, each of the power distribution assemblies is preferably placed, by swinging it about its center of rotation, in a closed position where each of the power distribution assemblies is very close to the chassis of the rack system. When service, maintenance, or repair needs to be done to the server system, each of the power distribution assemblies is preferably rotated about its hinge away from the closed position to an open position. In the open position, each of the power distribution assemblies preferably swings at least 90 degrees away from its closed position. Thus, when both power distribution assemblies are in their open position, operators and technicians have full access to any electrical components or cables that may traverse various locations at the back of the rack, including access to each chassis within the rack.

Preferably, however, each of the power distribution assemblies is capable of providing power to its respective chassis in the rack whether it is in the open or closed position. This capability has two aspects: power supplied to the power distribution assembly, and power from the power distribution assembly to the various chassis. Preferably, power is supplied to power rails within the power distribution assembly by way of a set of power cables supplying appropriate direct current (DC) voltage. These voltages are preferably provided from an array of onboard DC power supplies, preferably mounted near the bottom of the rack. However, this DC voltage may also be supplied by a customer from other power systems, e.g., a battery network. By coupling the power supply to the power distribution assembly with flexible cables, current may continue to flow whether the power distribution assemblies are in their closed or open positions. Likewise, power is provided from the power distribution assembly to the various chassis by way of flexible cables that couple between circuit breakers and the power distribution assembly and power backplane boards of each particular chassis.

BRIEF DESCRIPTION OF THE DRAWINGS

For a detailed description of the preferred embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function.

In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection, or through an indirect electrical connection via other devices and connections.

DESCRIPTION OF THE PREFERRED EMBODIMENTS

Figure 1:
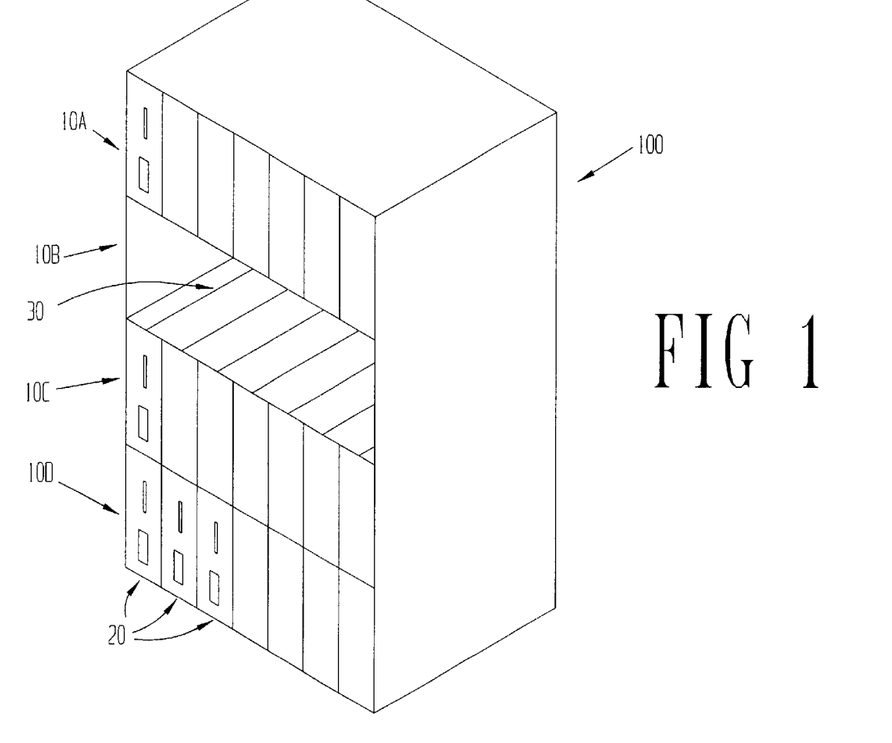
FIG. 1 shows an exemplary rack mounted server system.

Referring now to FIG. 1, there is shown an exemplary multiple chassis server system 100. The exemplary server system has a rack, and four chassis 10A–D. The rack provides a structural framework into which the chassis 10A–D are mounted. The rack defines a front, two sides, and a back. Though the rack may not have solid structures that define these surfaces, at a minimum the rack preferably has structural members at the four corners of the server system that provide the required structural support and further define the front, back and sides. Though four chassis 10A–D are shown in FIG. 1, any number of chassis may be a part of the server system 100. The preferred embodiment of the present invention handles three to five such chassis, and this ability is discussed more fully below. Each of the chassis 10A–D preferably contain a plurality of computers or servers 20. In the preferred embodiment, eight such servers 20 may be placed within any one chassis 10. While having eight servers in each chassis is the preferred implementation, any number of servers may be used. Thus, the server system 100 of FIG. 1 may have thirty-two servers 20. However, one of the chassis, chassis 10B in FIG. 1, is shown without the presence of any servers 20 to exemplify how each server 20 fits within its particular chassis 10. In particular, each chassis preferably contains a slot 30 for each server 20. It is within this slot 30 that a particular server 20 is installed for operation in the server system 100.

Figure 2:
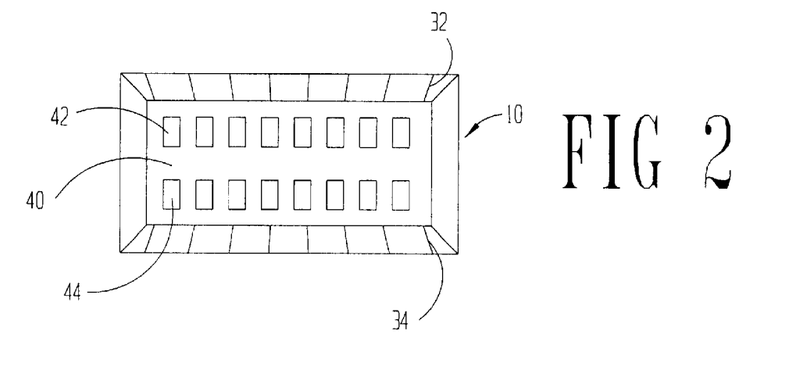
FIG. 2 shows a front perspective view of a chassis of the rack mounted server system.

Referring now to FIG. 2, there is shown a front perspective view of a chassis 10, which also shows a backplane board 40. Rather than having a cable bundle for each server 20, the preferred embodiment of the present invention utilizes a backplane board 40 having a plurality of connectors which allow for electrical connection of the server 20 upon insertion into the chassis 10. For example, the chassis 10 may comprise at least a data communication connector 42 and a power connector 44 for each of the servers 20. Having a connector 42 for data transmission and a connector 44 for power coupling is merely exemplary, and any number of data transmission and power couplers may be present, depending upon the particular application. Further, those connections may be placed on separate backplane boards, or may be collapsed into a single connector. FIG. 2 also shows that for each of the possible servers 20 to be inserted into the particular chassis, there is preferably a slot 30 having an upper portion 32 and a lower portion 34. Preferably, the server 20 is oriented vertically, as shown in FIG. 1, and inserted into one of the slots 30. The server 20 is then preferably pushed back into the chassis 10 until mating connectors (not shown) on the server 20 couple to the corresponding connectors 42, 44 on the backplane board 40.

Figure 3:
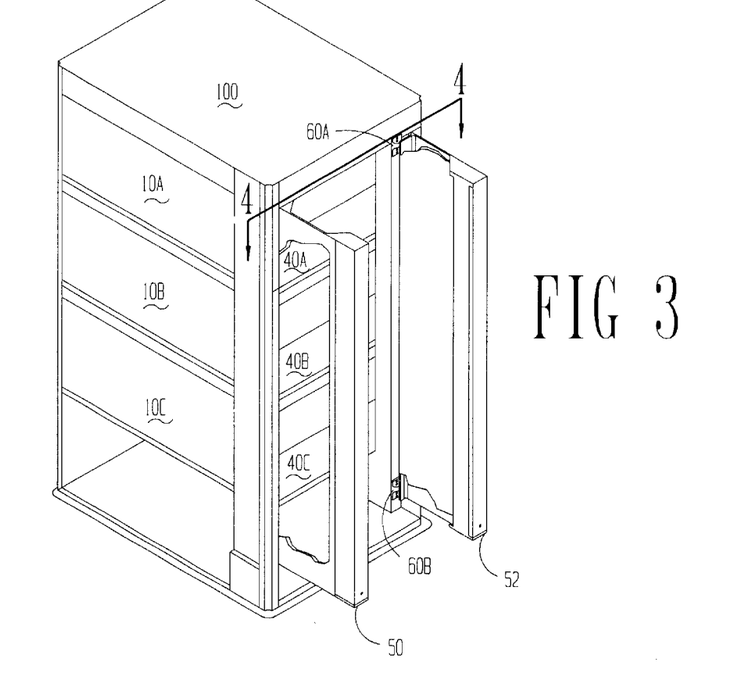
FIG. 3 shows a back perspective view of a server system in accordance with the preferred embodiment of the present invention.

Referring now to FIG. 3, there is shown a back perspective view of a server system 100 in accordance with the preferred embodiment of the present invention. Shown in FIG. 3 are three backplane boards 40A–C corresponding to three chassis 10A–C. Also shown in FIG. 3 are two power distribution assemblies 50 and 52. Each power distribution assembly 50, 52 is designed and constructed to house a supply and a return power bus bar (not shown in FIG. 3), as well as a plurality of circuit breakers (not shown in FIG. 3). It is envisioned that the power distribution assemblies 50, 52 are substantially the same, except that they are mirror copies of each other. Though not shown in FIG. 3, in the preferred embodiment each power distribution assembly 50, 52 has a plurality of cables extending from the main body of the distribution assembly 50, 52 to each of the server chassis 10A–C. It is through these plurality of cables that power is provided to each chassis 10A–C in the server system 100.

Figure 4:
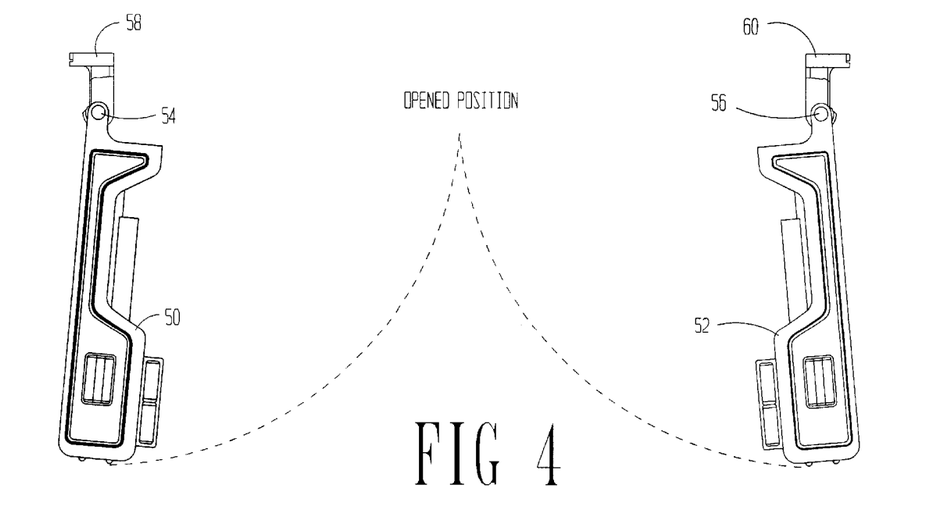
FIG. 4 shows an overhead view of the power distribution assemblies in the open position taken substantially along line 4—4 of FIG. 3.

In addition to housing bus bars, breakers, and providing an origin point for power cables extending to the chassis 10A–C, the power distribution assemblies 50, 52 are also advantageously connected to the rack of the server system 100 in such a way as to allow access to a back portion of the server system 100, including the backplane boards 40A–C. Referring still to FIG. 3, the power distribution assemblies 50, 52 are shown in their extended or open position. Referring now to FIG. 4, which is a view taken substantially along line 4—4 of FIG. 3, there is shown an overhead view of the power distribution assemblies 50 and 52 in their open positions, with the dashed line indicating the path of travel of each assembly. In particular, the left power distribution assembly 50 (viewed from the back of the server system 100) connects to the rack of the server system 100 by a hinge 58. The power distribution assembly 50 rotates about hinge point 54 along the dashed line shown in FIG. 4. Likewise, the right power distribution assembly 52 (again when viewed from the back of the server system 100) connects to the rack of the server system 100 by way of a hinge 60, and rotates about hinge point 56 along the dashed line shown in FIG. 4. It will be understood that the view of FIG. 4 is taken substantially along line 44 of FIG. 3, and thus only the upper-most hinges 58, 60 are shown. In the perspective view of FIG. 3, however, the two hinges of the right power distribution assembly 52 are shown, in particular hinges 60A and 60B. In the perspective view of FIG. 3, the hinges for the power distribution assembly 50 cannot be seen.

Figure 5:
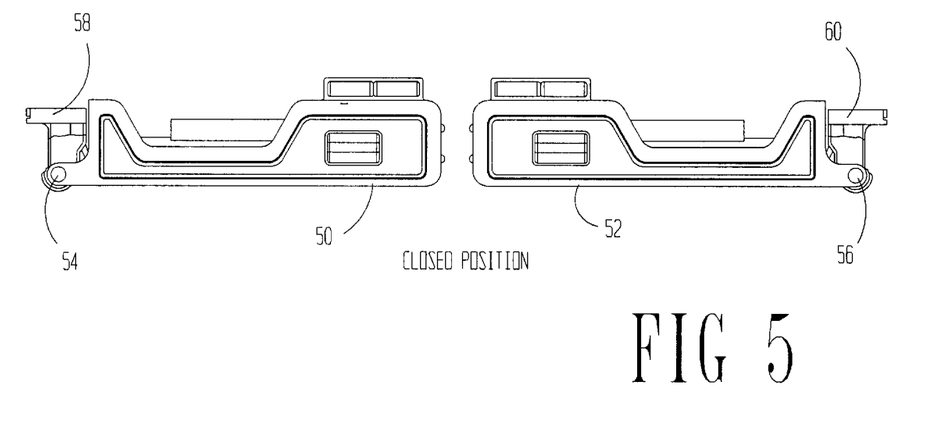
FIG. 5 is an overhead view of the power distribution assemblies in the closed position.

Referring now to FIG. 5, there is shown each of the power distribution assemblies 50 and 52 in their retracted or closed position. Referring to FIGS. 3-5 somewhat simultaneously, it may be seen that the power distribution assemblies 50, 52 may be either in an open position (FIG. 4) or closed position (FIG. 5) as may be necessary to perform maintenance or repair on the server system 100. It is envisioned that for maintenance to a back portion of the server system 100, e.g., replacement of a backplane board 40A–C, that the power distribution assemblies 50, 52 would initially be in a closed position (normal operation) and then would be moved to an open position (FIG. 4) so that the operator or technician would have access to devices on the back of the server system 100.

Figure 6:
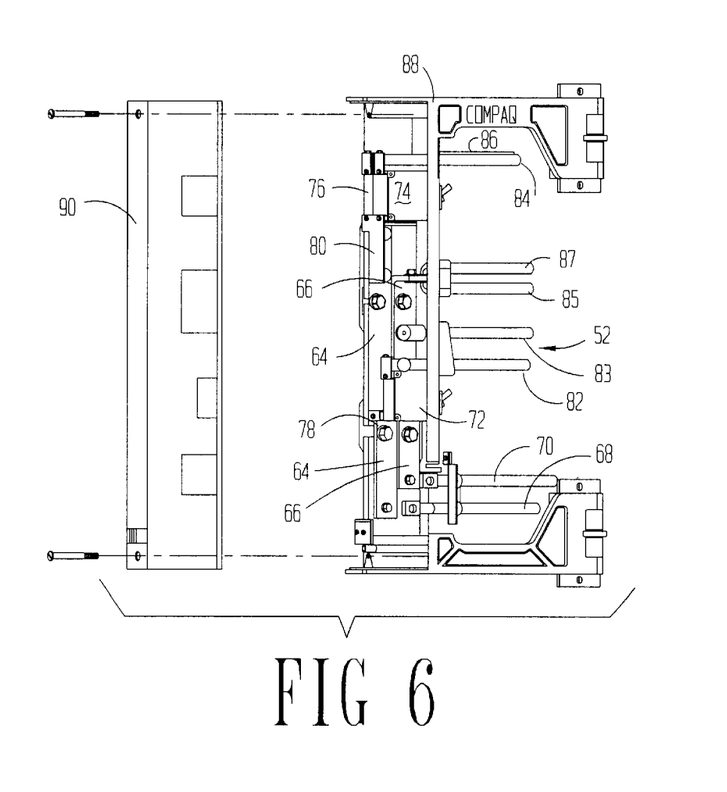
FIG. 6 shows a detailed view of the right power distribution assembly.

Referring now to FIG. 6, there is shown a more detailed view of the right power distribution assembly 52. A description of only one of the power distribution assemblies is sufficient to describe them both inasmuch as they are preferably mirror copies of each other. In other words, only minor differences may exist between the left power distribution assembly 50 and the right power distribution assembly 52. Preferably, each power distribution assembly 50, 52 has two bus bars mounted therein. In the preferred embodiments, these bus bars are preferably a supply bus bar 64 and a return bus bar 66. In FIG. 6, each of these bus bars 64, 66 are marked in various locations so as to be discernable from the rest of the equipment. In the preferred embodiment, the supply bus bar 64 carries –48 Volt direct current (DC) voltage. Relatedly, the return bus bar 66 preferably is designated as the return or neutral. In the prior art, each chassis 10A–C, and possibly each server 20 within each chassis has its own power supply for converting alternating current (AC) voltages to DC voltages. Because prior art power supplies were provided higher voltage AC supplies, amperage requirements were smaller. One of ordinary skill in the art is well aware that as the voltage increases, the current requirement decreases for providing the same amount of power. Thus, in the prior art, the supply of 120 Volt AC and possibly 240 Volt AC power to the supplies may require relatively small cables. However, those power supplies took up valuable space within the server system 100.

In the preferred embodiments, the individual AC-DC power supplies for each server are not used, and instead each chassis 10A–C is supplied with DC power from elsewhere. Thus, the preferred embodiments provide –48 volt DC power to each chassis. Because this lower voltage is provided, the current carrying capability must be high to provide the necessary power. Referring still to FIG. 6, each of the supply bus bar 64 and return bus bar 66 are rated for 425 amps DC. Each of these bus bars 64, 66 are preferably constructed of No. 110 half-hard copper. The supply and return current is preferably coupled to the supply bus bar 64 and return bus bar 66 by way of a supply and return cable 68 and 70, respectively. These cables 68, 70 preferably couple to a DC power supply or some other source of power, e.g., a battery system. While in the preferred embodiment the supply cable 68 and return cable 70 couple to the power distribution assembly 50, 52 near the bottom, this is only exemplary and the connection point could be moved to an upper portion of the power distribution assembly 50, 52, if the particular installation required. The supply cable 68 and return cable 70 preferably couple to the supply bus bar 64 and return bus bar 66 by way of a Rapid Lock™ system available from Elcon Products International Company, P.O. Box 1885, Freemont, Calif. 94538. While use of the Rapid Lock™ system is preferred for connecting the supply cables to the power distribution assemblies, any suitable means may be used, including standard lugs.

In the preferred embodiment, each power distribution assembly 50, 52 may have from three to five circuit breakers. In the exemplar drawing of FIG. 6, three such circuit breakers 72, 74 and 76 are shown. In the preferred embodiments, each of the circuit breakers 72, 74, 76 are rated for 70 amps DC. As can be seen in FIG. 6, each circuit breaker 72, 74, 76 preferably couples to the supply bus bar 64. In particular, circuit breaker 72 couples to the supply bus bar 64 by way of a small copper bus branch 78, which couples to the bus bar 64 and the circuit breaker 72 by way of a bolt. Likewise, for the uppermost circuit breakers 74, 76 couple to the supply bus bar 64 by way of bus branch 80. All the hardware within the mounting cover, e.g., the bus bars, circuit breakers, bus branches, are considered power distribution hardware. On the downstream side of each circuit breaker 72, 74 and 76 are supply cables 82, 84 and 86. Along with their respective return cables (83 for supply cable 82 and either of return cable 85 or 87 for supply cables 84 and 86), each circuit breaker 72, 74 and 76 preferably feeds one chassis 10A–C. As can be seen in FIG. 6, at least a portion of each circuit breaker extends outside the hollow interior of the mounting cover. It will be understood however that although FIG. 6 shows only the right power distribution assembly 52, the left power distribution assembly 50 is similarly constructed, including corresponding circuit breakers. In the preferred embodiments, each chassis 10A–C is provided power through two circuit breakers, one residing in each power distribution assembly 50, 52. These supplies are preferably fully redundant such that each rack may be supplied power by way of only one circuit breaker in one power distribution assembly. In this way, loss of a power supply, or maintenance required on a power distribution assembly 50 or 52, may take place without loss of power to the particular chassis 10A–C (so long as the second power distribution assembly 50, 52 is still operational).

Because each power distribution assembly 50, 52 contains relatively high voltage electrical components and currents, the electrical shroud or mounting cover 88, which comprises the entire outer portion of the power distribution assembly 50, 52, is preferably made of non-conductive material. In the preferred embodiment, this non-conductive material is Noryl FN 215X structural foam plastic. Because the supply cable 68 and return cable 70 must be connected during installation, and because some maintenance may be required, especially on the circuit breaker 72, 74 and 76, the mounting cover 88 preferably comprises a removable cover 90 (FIG. 6). This removable cover 90 allows access to the connection points for the supply cable 68 and return cable 70, as well as access to the breakers 72, 74 and 76, and all electrical connections within the power distribution assembly 50, 52. This non-conductive material also provides structural support for the power distribution hardware therein. Before moving on, it must be understood that the embodiment shown in FIG. 6 has only three circuit breakers. However, use of the power distribution assemblies 50, 52 may be extended to any suitable number of circuit breakers, but preferably have no fewer than three and no greater than five circuit breakers. If five circuit breakers are used, the length of the power distribution assembly 50, 52 is extended to accommodate the additional circuit breakers. In the preferred embodiments, the additional circuit breakers preferably mount within the power distribution assembly 50, 52 in a manner similar to that shown for circuit breaker 72.

Figures 7, 9:
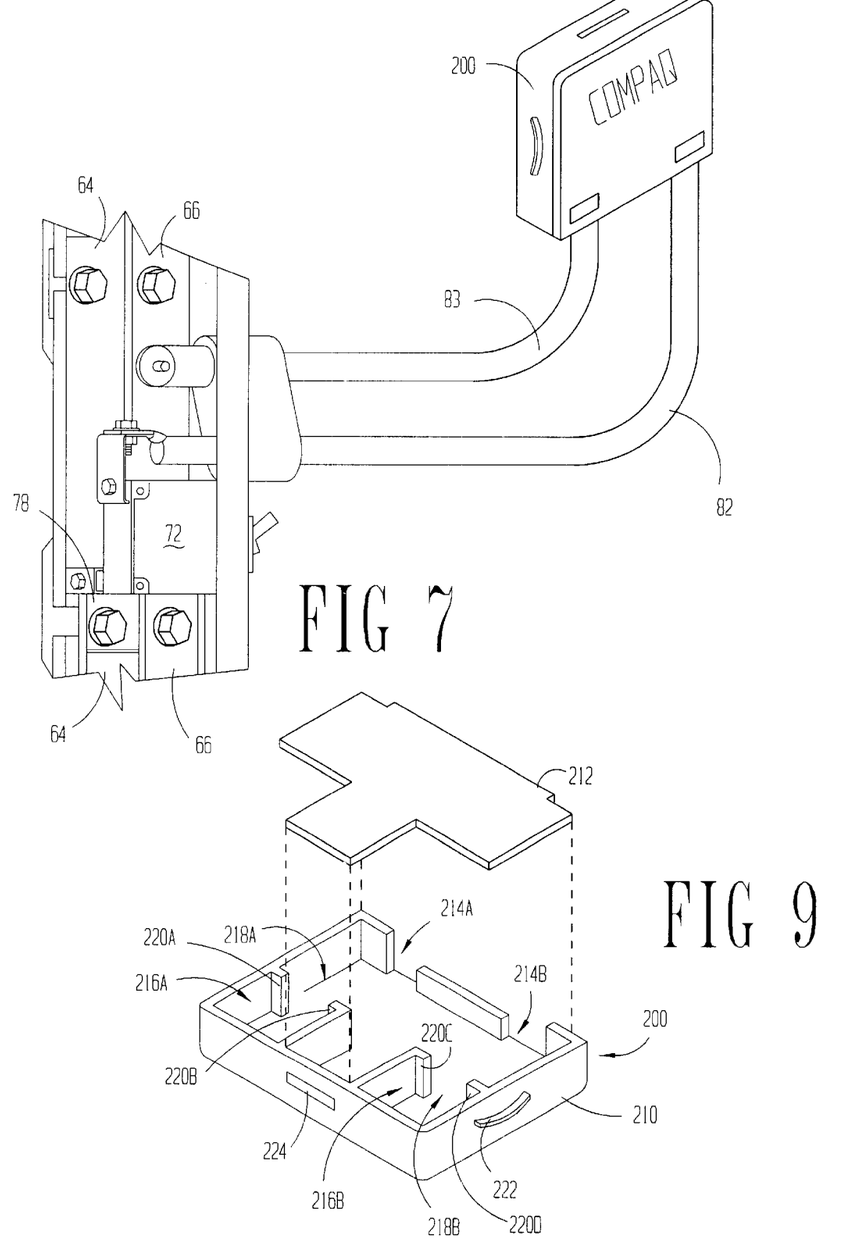
FIG. 7 shows a detailed view of a circuit breaker within the power distribution assembly, and also shows the chassis supply, chassis return and cable coupler of the preferred embodiment.
FIG. 9 shows a back perspective view of the cable-end housing of the preferred embodiment.

FIG. 7 shows a more detailed view of circuit breaker 72 within the power distribution assembly 52, and also shows connection of the chassis supply 82 and return 83 cables within the cable-end housing 200. In broad terms, the cable-end housing 200 is designed and constructed to house both the chassis supply 82 and chassis return 83 cables from the power distribution assembly 50, 52. The cable-end housing 200, in combination with other structures discussed subsequently, ensures that the polarity of the connection for power to a chassis 10A–C is correct. Further, the cable-end housing 200 allows for connection of both the chassis supply 82 and chassis return 83 cables simultaneously.

Figure 8:
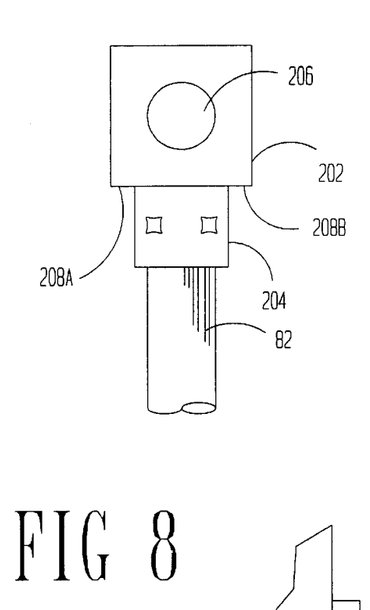
FIG. 8 shows an elevational view of an exemplary chassis supply cable coupled to a right-angle connector.

Referring now to FIG. 8, there is shown an exemplary chassis supply cable 82 coupled to the right-angle connector 202, which is preferably a Rapid Lock™ connector produced by Elcon, as discussed above with respect to the supply cable 68 and return cable 70. The connector 202 preferably makes electrical contact with the conductors of the chassis supply cable 82 by way of any suitable connection device, e.g., a crimp-type coupler 204. Electrical currents flow through the metal of the crimp-type coupler 204 to finger-like arms (not shown) within the aperture 206. The right-angle connector 202 preferably also has two shoulders 208A and 208B. The importance of these shoulders becomes clear with regard to a discussion of the cable-end housing 200.

Referring now to FIG. 9, there is shown a back perspective view of the cable-end housing 200. In particular, FIG. 9 shows that the two major portions of the cable-end housing 200 are the front cover 210 and back cover 212. Assembly of the cable-end housing 200 preferably involves placing an end of each of the chassis supply cable 82 and rack return cable 83 into the cable-end housing. In particular, the right-angle connector 202 associated with each of the chassis supply and chassis return cable 82, 83 are preferably placed through one of the bottom apertures 214A, B. Preferably, each right-angle cable connector 202 associated with each supply or return cable 82, 83 slides into the connector mating portion 216A or 216B. The cable associated with that connector 202 then protrudes through the interior aperture 218A, B and out of the cable-end housing 200 by means of the bottom apertures 214A, B. Each of the connector mating portions 216A, B of the front cover 210 have interior shoulders 220 (220A, B for portion 216A, and 220C, D for connector mating portion 216B). Preferably, each shoulder 208A, B of the right-angle connector 202 (FIG. 8) contacts the shoulders 220 in such a way as to retain the right-angle connector 202 and corresponding cable 82, 83 within the cable-end housing 200. Finally, back cover 212 is connected to the front cover 210 in such a way as to retain the respective cables within the cable-end housing 200 from being pulled in a direction generally perpendicular to that of the cable direction. The combination of the front cover 210 and back cover 212 also provide stress relief for the respective cables, especially through the apertures 214A, B.

Also shown in FIG. 9 are two features that aid in the installation and removal of the cable-end housing 200 generally. In particular, FIG. 9 shows a semi-circular protrusion 222. This semi-circular protrusion 222, and the corresponding protrusion on the opposite side (not shown in FIG. 9), provide a location for an operator or technician to grasp the cable-end housing 200 during installation and removal. The semi-circular protrusion preferably has its open side directed toward the back cover 212. Further, the front cover 210 also preferably comprises a pry aperture 224. This aperture is preferably located such that during removal of the cable-end housing 200, an operator or technician may place the flat blade of a screwdriver within this pry aperture 224, and in combination with other components to be discussed below, aid in the removal of the cable-end housing 200.

Figure 10:
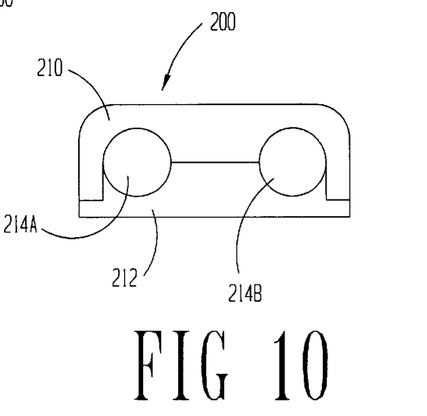
FIG. 10 shows a view of the cable-end housing from the bottom.

The perspective view of the cable-end housing 200 shown in FIG. 9 is simplified with respect to the back cover 212 and the apertures 214 and 218. Referring to FIG. 10, there is shown a view of the cable-end housing 200 from the bottom, i.e., the direction through which the cables 82, 83 extend into the cable-end housing 200. Preferably, the front cover 210 and the back cover 212 form substantially circular apertures 214A, B. The radius of these apertures is preferably sized to be just slightly larger than the outer diameter of the particular cable used. Though not shown in FIG. 10, the internal apertures 218A, B are also preferably circular in nature. However, the diameter of the internal apertures 218A, B may be larger to accommodate the crimp coupler 204.

Figure 11:
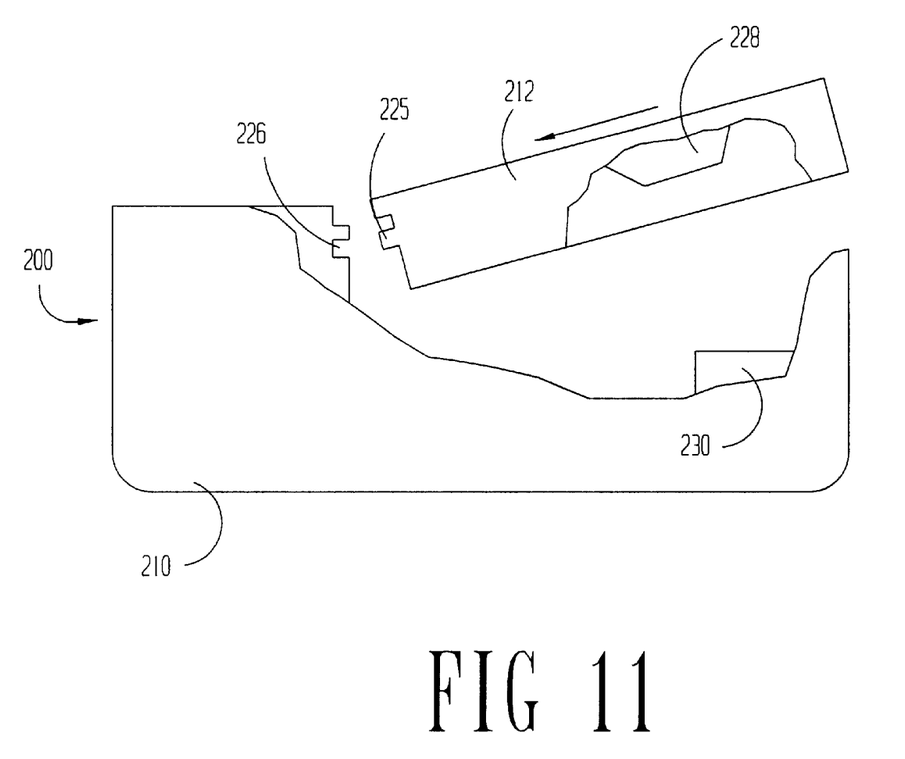
FIG. 11 shows a side cut-away view of the cable-end housing.

Referring now to FIG. 11, there is shown a side view cutaway drawing of the cable-end housing 200. In particular, the front cover 210 has a side cutaway to show how the back cover 212 connects to the front cover 210. In particular, the back cover 212 connects by "toe-in" to the front cover 210. This toe-in mechanism is accomplished by means of a rectangular protrusion 225 on the front surface of the back cover 212, and a mating latch structure 226 on the front cover 210. The directional arrow in FIG. 11 shows the direction that the back cover 212 is mated with the front cover 210 which involves pushing the back cover 212 such that the protrusion 225 and the latch 226 mate. Once these devices are mated, the back cover 212 then rotates, with its point of rotation being the interface between the rectangular protrusion 225 and the latch 226 until the cover is properly in place. Using the protrusion 225 and latch 226 on the back cover 212, the preferred embodiment requires only one screw (not shown) to hold the cover 212 in place. This screw extends through reinforcing member 228 of the back cover and into reinforcing member 230 of the front cover 210.

Figure 12:
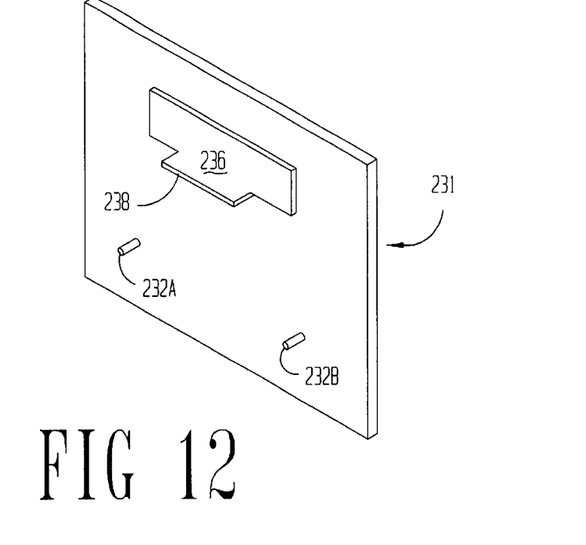
FIG. 12 shows the relationship of two electrically conductive pins and a connection guide.
Figure 13:
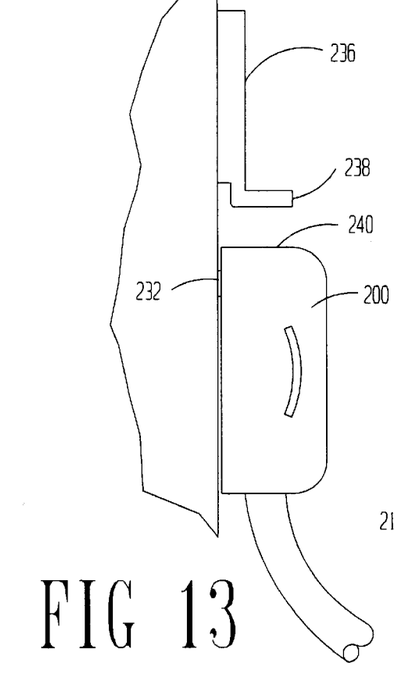
FIG. 13 shows a cable-end housing coupled to pins of the connection area.

Referring now to FIG. 12, there is shown a connection area 231 including a set of electrical contact pins 232A and B. This connection area 231 may be part of a backplane board 40A–C, or may be mounted on a structural member on the rack, e.g., a metal brace extending across the back of the rack. Regardless of its location, the connection area 231 is where the cable-end housing 231 preferably couples to transfer DC power to the racks 10A–C. The pins 232A, B are preferably sized to fit within the aperture 206 of the right-angle connector 202 (see FIG. 8). Fingers within the aperture 206 (not shown) contact the pins 232A, B in such a way as to allow electrical current to flow, whether that current is from the supply to the servers of the server system 100 or the return current through ground or neutral. Also shown in FIG. 12 is connection guide 236. Connection guide 236 preferably performs two functions. First, its placement above the pins 232A, B acts as a safety mechanism for the connecting of the cable-end housing 200 to the system. Because of lip 238 of the connection guide 236, the cable-end housing 200 may only be placed onto the pins 232A, B in one orientation. Referring to FIG. 13, there is shown the cable-end housing 200 connected to the pins 232 (only one of which is shown in FIG. 13). As can be seen, the apertures leading to the right-angle connectors of the cable-end housing 200 are off center such that a top portion 240 of the cable-end housing 200 lies near the lip 238 of the connection guide 236 when coupled to the pins 232A, B. Referring generally to FIGS. 9 and 13, it is seen that the cable-end housing 200 will only fit onto the pins 232A, B in one direction. If an operator or technician tries to turn the cable connector upside down to install it, the lip 238 does not allow for proper installation, thus negating the possibility of inadvertently connecting the cable coupler wrong, which could result in reversing the polarity of the power supply and subsequent damage to downstream equipment.

The second function of the connection guide 236 was mentioned with respect to the pry aperture 224 (see FIG. 9).

During removal or disconnection of the cable-end housing 200, it is envisioned that an operator or technician may take a flat blade screwdriver and place the blade of that screwdriver within the pry aperture 224. The portion of the screwdriver contacting the lip 238 acts as a hinge point, and the blade portion of the screw driver within the pry aperture acts as force application point. Thus, by pushing a portion of the screw driver opposite the pry aperture, mechanical advantage is obtained in the removal of the cable-end housing 200.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A server system comprising:
    a rack defining two side portions substantially parallel to each other, and a back portion substantially at right angles to the two side portions;
    a plurality of chassis mounted in the rack each having a power backplane board proximate to and substantially parallel to the back portion of the rack;
    a power distribution assembly comprising a supply bus bar, a return bus bar, and a plurality of circuit breakers, the power distribution assembly movably connected to the back portion of the rack, said power distribution assembly coupling power from a power supply to at least one power backplane board; and
    wherein the power distribution assembly is adapted to extend away from the rack in an open position, and retract to be proximate to the back portion of the rack in a closed position.

2. The server system as defined in claim 1 wherein the power distribution assembly further comprises:
    said power distribution assembly hinged proximate to the back of the rack;
    wherein the power distribution assembly is adapted to rotate such that in the closed position the power distribution assembly is proximate a center of the back portion of the rack, and in the open position forms an angle of at least ninety degrees with respect to the closed position.

3. The server system as defined in claim 2 wherein the power distribution assembly further comprises:
    an upper hinge having a rotating portion and a stationary portion, the stationary portion attached at a first elevation on the back portion of the rack proximate to an intersection of one of the two side portions and the back portion;
    a lower hinge having a rotating portion and a stationary portion, the stationary portion of the lower hinge mounted at a second elevation lower than the first elevation, the stationary portion of the lower hinge attached to the rack proximate to the intersection of one of the two side portions and the back portion; and
    a mounting cover attached to each of the rotating portions of each of the upper and lower hinges.

4. A server system comprising:
    a rack defining two side portions substantially parallel to each other, and a back portion substantially at right angles to the two side portions;
    a plurality of chassis mounted in the rack each having a power backplane board proximate to and substantially parallel to the back portion of the rack;
    a power distribution assembly comprising power distribution hardware, the power distribution assembly hinged proximate to the back of the rack, comprising:
        an upper hinge having a rotating portion and a stationary portion, the stationary portion attached at a first elevation on the back portion of the rack proximate to an intersection of one of the two side portions and the back portion;
        a lower hinge having a rotating portion and a stationary portion, the stationary portion of the lower hinge mounted at a second elevation lower than the first elevation, the stationary portion of the lower hinge attached to the rack proximate to the intersection of one of the two side portions and the back portion; and
        a mounting cover attached to each of the rotating portions of each of the upper and lower hinges, said mounting cover having a length, defining a substantially closed surface, and having a hollow interior;
        a power supply rail in the hollow interior of the mounting cover; a power return rail in the hollow interior of the mounting cover, the power return rail running substantially parallel to the power supply rail; and
        a plurality of circuit breakers electrically coupled to the power supply rail, at least a portion of the circuit breakers within the hollow interior of the mounting cover;
    wherein the power distribution assembly is adapted to rotate such that in the closed position the power distribution assembly is proximate a center of the back portion of the rack, and in the open position forms an angle of at least ninety degrees with respect to the closed positions.

5. The server system as defined in claim 4 wherein the power distribution hardware further comprises:
    plurality of power supply cables coupled one each to the circuit breakers, the power supply cables further coupled to the power backplane boards of the plurality of racks; and
    a plurality of power return cables coupled one each to the power return rail, the power return cables further coupled to the power backplane boards of the plurality of racks.

6. The server system as defined in claim 4 wherein the substantially closed surface with a hollow interior has a substantially rectangular cross-section.

7. A method of operating a rack housing chassis with electronic devices, the rack having a first and second set of power rails, each set of power rails oriented substantially vertically, the method comprising:
    retracting each of the first and second sets of power rails to a closed position wherein the first and second sets of power rails define a plane that is substantially parallel to a back of the rack; and
    extending each of the first and second sets of power rails to an open position away from the back of the rack;
    supplying power to the electronic devices through the first and second sets of power rails during the retracting and extending steps, and wherein the power rails remain vertically oriented during the retracting and extending steps.

8. The method of operating a rack as defined in claim 7 wherein retracting and extending the first and second sets of power rails further comprises:
    swinging each of the first and second sets of power rails to the closed position; and swinging each of the first and second sets of power rails away from the back of the rack to the open position.

9. The method of operating a rack as defined in claim 8 wherein swinging each of the first and second sets of power rails further comprises:

hinging the first set of power rails to a first edge of the back of the rack, the first edge proximate to an intersection of a first side of the rack and the back of the rack; and hinging the second set of power rails to a second edge of the back of the rack, the second edge proximate to an intersection of a second side of the rack and the back of the rack.

10. The method of operating a rack as defined in claim 8 wherein swinging each of the first and second power rails away from the back of the rack further comprises:

swinging the first set of power rails until it forms an angle of at least ninety degrees with the back of the rack; and swinging the second set of power rails until it forms an angle of at least ninety degrees with the back of the rack.

11. A structure for housing electronic devices, the structure comprising:

a rack defining a front, back and two sides;

a chassis mounted in the rack;

a power backplane board mounted within the chassis proximate and substantially parallel to the back of the rack;

a first pair of power rails mounted to the back of the rack, the first pair of power rails oriented substantially vertically and supply power from a power supply to the backplane board;

wherein the first pair of the power rails are adapted to extend away from the back of the rack to allow access to the back of the rack while supplying power to the backplane board; and wherein the first pair of power rails are adapted to retract to be proximate to the back of the rack while supplying power to the backplane board.

12. The structure for housing electronic devices as defined in claim 11 wherein the first pair of power rails further comprise:

said first pair of power rails adapted to rotate about a hinge point being substantially at an intersection of the side of the rack and the back of the rack;

wherein the first pair of power rails swing about hinge point to retract to be proximate to the back of the rack; and wherein the first pair of power rails swing about the hinge point to extend away from the back of the rack.

13. The structure for housing electronic devices as defined in claim 12 wherein the first pair of power rails swing about the hinge point to extend away from the back of the rack to form an angle of at least ninety degrees with back of the rack.

14. The structure for housing electronic devices as defined in claim 12 wherein the first pair power rails swing about the hinge point to retract to be substantially parallel with the back of the rack.

15. The structure for housing electronic devices as defined in claim 12 wherein the first pair of power rails further comprises a plurality of circuit breakers coupled to the first pair of power rails and adapted to extend and retract with the first set of power rails.

16. The structure for housing electronic devices as defined in claim 11 further comprising:

a second pair of power rails mounted to the back of the rack opposite the first pair of power rails, the second pair of power rails oriented substantially vertically;

wherein the second pair of power rails are adapted to extend away from the back of the rack to allow access to the back of the rack; and wherein the second pair of power rails are further adapted to retract to be proximate to the back of the rack.

17. The structure for housing electronic devices as defined in claim 16 wherein the first and second pairs of power rails further comprise:

said first pair of power rails adapted to rotate about a first hinge point substantially at an intersection of a first side of the rack and the back of the rack;

said second pair of power rails adapted to rotate about a second hinge point substantially at an intersection of a second side of the rack and the back of the rack;

wherein the first and second set of power rails swing about the first and second hinge point respectively to be proximate to the back of the rack; and wherein the first and second set of power rails swing about the first and second hinge point respectively to extend away from the back of the rack.

18. The structure for housing electronic devices as defined in claim 17 wherein the first and second sets of power rails swing about their respective hinge points to retract to be substantially parallel with the back of the rack.

19. The structure for housing electronic devices as defined in claim 17 wherein the first and second power rails swing about their respective hinge points to extend away from the back of the rack, each of the first and second power rails forming an angle with the back of the rack in the open position of at least ninety degrees.

20. The structure for housing electronic devices as defined in claim 17 wherein the first and second power rails further comprise:

a plurality of circuit breakers coupled to the first pair of power rails;

a plurality of circuit breakers coupled to the second pair of power rails; and wherein each of the plurality of circuit breakers is adapted to extend and retract with their respective sets of power rails.

21. A structure of a server system comprising:

a rack means for providing a structure in which to house servers of the server system, the rack means defining two side portions substantially parallel to each other, and a back portion substantially at right angles to the two side portions;

a plurality of chassis means for holding servers in a vertical orientation in the rack means, the chassis means mounted in the rack, and each chassis means having a power backplane board proximate to and substantially parallel to the back portion of the rack means;

a power distribution means for distributing power to the plurality of chassis means, the power distribution means housing power distribution hardware, and where the power distribution means is movably connected to the back portion of the rack means; and wherein the power distribution means is adapted to extend away from the rack means in an open position, and retract to be proximate to the back portion of the rack means in a closed position.

22. The server system as defined in claim 21 wherein the power distribution means further comprises:

said power distribution means hinged proximate to the back of the rack;

wherein the power distribution means is adapted to rotate such that in the closed position the power distribution means is proximate a center of the back portion of the rack means, and in the open position forms an angle of at least ninety degrees from the closed position.

23. The server system as defined in claim 22 wherein the power distribution means further comprises:

an upper hinge means for providing a first rotatable connection, the upper hinge means attached at a first elevation on the back portion of the rack means proximate to an intersection of one of the two side portions and the back portion;

a lower hinge means for providing a second rotatable connection, the lower hinge means attached at a second elevation lower than the first elevation, the lower hinge means further attached to the rack means proximate to the intersection of one of the two side portions and the back portion; and a electrical shroud means for providing structural support and electrical isolation for the power distribution hardware, the electrical shroud means attached to a rotating portion of each of the upper and lower hinge means.

24. A structure of a server system comprising:

a rack means for providing a structure in which to house servers of the server system, the rack means defining two side portions substantially parallel to each other, and a back portion substantially at right angles to the two side portions;

a plurality of chassis means for holding servers in a vertical orientation in the rack means, the chassis means mounted in the rack, and each chassis means having a power backplane board proximate to and substantially parallel to the back portion of the rack means;

a power distribution means for distributing power to the plurality of chassis means, the power distribution means housing power distribution hardware, said power distribution means hinged proximate to the back of the rack, the power distribution means further comprising:

an upper hinge means for providing a first rotatable connection, the upper hinge means attached at a first elevation on the back portion of the rack means proximate to an intersection of one of the two side portions and the back portion;

a lower hinge means for providing a second rotatable connection, the lower hinge means attached at a second elevation lower than the first elevation, the lower hinge means further attached to the rack means proximate to the intersection of one of the two side portions and the back portion;

a electrical shroud means for providing structural support and electrical isolation for the power distribution hardware, the electrical shroud means attached to a rotating portion of each of the upper and lower hinge means;

said electrical shroud means having a length, defining a substantially closed surface, and having a hollow interior;

a power supply rail in the hollow interior of the electrical shroud means;

a power return rail in the hollow interior of the electrical shroud means, the power return rail running substantially parallel to the power supply rail; and a plurality of circuit breakers electrically coupled to the power supply rail, at least a portion of the circuit breakers within the hollow interior of the electrical shroud means;

wherein the power distribution means is adapted to rotate such that in the closed position the power distribution means is proximate a center of the back portion of the rack means, and in the open position forms an angle of at least ninety degrees from the closed position.

25. The server system as defined in claim 24 wherein the power distribution hardware further comprises:

a plurality of power supply cables coupled one each to the circuit breakers, the power supply cables further coupled to the power backplane boards of the racks; and a plurality of power return cables coupled one each to the power return rail, the power return cables further coupled to the power backplane boards of the rack means.

26. The server system as defined in claim 24 wherein the substantially closed surface with a hollow interior has a substantially rectangular cross-section.

* * * * *